United States Patent [19]

Miyauchi et al.

[11] 3,890,042
[45] June 17, 1975

[54] MECHANISM FOR MOUNTING CONTACT SCREEN IN PHOTOENGRAVING CAMERA

[75] Inventors: Yoshio Miyauchi, Hikone; Tetsuji Okuno, Shiga-ken, both of Japan

[73] Assignee: Dainippon Screen Seizo Kabushiki-Kaisha, Kyoto, Japan

[22] Filed: Nov. 16, 1973

[21] Appl. No.: 416,365

[30] Foreign Application Priority Data
Nov. 16, 1972 Japan................................ 47-11427

[52] U.S. Cl..................................... 355/53; 96/116
[51] Int. Cl. ........................................ G03b 27/42
[58] Field of Search ............. 355/53, 18, 74; 96/45, 96/116

[56] References Cited
UNITED STATES PATENTS

| | | | |
|---|---|---|---|
| 1,846,972 | 2/1932 | Koppe.................................... | 355/53 |
| 2,115,233 | 4/1938 | Powers................................. | 96/116 |
| 2,126,479 | 8/1938 | Landrock et al. .................... | 96/116 |
| 2,564,934 | 8/1951 | Sussin ................................... | 96/116 |
| 2,643,187 | 6/1953 | Linzell ................................. | 96/116 |
| 2,981,625 | 4/1961 | Powers et al. ......................... | 96/45 |
| 3,041,931 | 7/1962 | Anander ................................ | 96/116 |
| 3,063,337 | 11/1962 | Anander ................................ | 96/116 |
| 3,068,748 | 12/1962 | Schutt et al............................ | 96/116 |
| 3,593,228 | 7/1971 | Miyauchi .............................. | 355/74 |
| 3,801,200 | 4/1974 | Nishikawa et al. .................... | 96/116 |

Primary Examiner—Richard L. Moses
Attorney, Agent, or Firm—Lilling & Siegel

[57] ABSTRACT

A contact screen mounting mechanism comprising a contact screen retaining frame adopted to move the contact screen from outside the photographing light path to a location in front of the film holder, and squeegee means arranged to be movable up and down so as to closely attach said contact screen to said film holder. Said contact screen retaining frame is arranged movable toward or away from said film holder surface in accordance with vertical movement of said squeegee means.

10 Claims, 4 Drawing Figures

MECHANISM FOR MOUNTING CONTACT SCREEN IN PHOTOENGRAVING CAMERA

This invention relates to a device for correctly and efficiently mounting at a predetermined position a contact screen for photographing a halftone in a photoengraving camera.

Generally, in photographing a halftone with a photoengraving camera by using a contact screen, the contact screen is intimately attached in superposed relation to a lith type film retained in the photographing section and then the film, with the contact screen superposed thereon, is exposed to the line or image to be photographed. During this process, if attachment between said lith type film and contact screen is imperfect, the dot size becomes deranged to excessively deteriorate the quality of the photographed halftone image. In order to avoid this, usually a vacuum suction type film holder is used to superposed and tightly attach the lith type film and contact screen against each other by vacuum suction, and further, the air trapped between the contact screen and lith type film is dispelled by squeegee rollers or other like means to thereby attain perfect attachment. In most of the existing photoengraving cameras using a sheet film, a suction type film holder is hinged to the photographing section so that the film holder may be opened rearwardly of the photographing section to allow easy attachment and detachment of the lith type film and contact screen.

However, in the photoengraving camera using a roll film, which have been developed recently to meet the industrial requirements for improved efficiency, the film holder is fixed as a rule, with the film roll and contact screen being contained in a body portion above said film holder, and in operation, the film is drawn out in front of the film holder or the contact screen is moved down as occasion demands. In this case, since the film holder is fixed, it is difficult for the operator to manually attach the film tightly to the contact screen with a squeegee roller. Therefore, such roll film type photoengraving cameras require a specific automatic mechanism.

In one example of such type of apparatus, squeegee rollers are vertically movably installed in the frame sustaining the contact screen and an auxiliary roller is provided below and slightly spaced apart from said squeegee rollers such that the former will be driven integral with the latter, while the contact screen is passed between said both rollers so that when said both rollers descend, the contact screen will be tightly attached to the film holder surface by the action of the squeegee rollers and when said both rollers ascend, the contact screen will be separated from the film holder surface by the operation of the auxiliary roller.

This arrangement permits positive and secure attachment and separation of the contact screen, eliminating the conventional problem that, due to electrostatic strictly generated in the contact screen and/or other reasons, the contact screen could fail to trouble sufficiently from the film holder even if vacuum suction on the film holder is released, thus giving rise to troublle in the next operation. In this type of apparatus, however, an auxiliary roller is required in addition to the squeegee rollers, and also since both rollers are vertically movably mounted in the frame which sustains the contact screen, the weight and volume of this section are increased to make less expedient the operation of moving the contact screen off the photographing light path from the front of the film holder when performing line photographing. Further, as the auxiliary roller rolls in contact with the surface of the contact screen, the latter is liable to suffer cuts or flaws, and also difficulty is attended in exchange of contact screen.

The present invention is to provide a novel contact screen mechanism in a photoengraving camera, which is completely free of the above-said defects and which is characterized by provision of a retaining frame adapted to retain the contact screen and to move it from outside the photographing light path to the location in front of the film holder, and squeegee means arranged to be moved vertically so as to tightly attach said contact screen to said film holder, wherein said contact screen retaining frame is moved toward or away from the film holder surface in accordance with vertical movement of said squeegee means.

The invention is now described in detail with reference to the accompanying drawings.

In the drawings, FIGS. 1 and 2 are transverse sectional views of one embodiment of the present invention as adapted to a roll film type photoengraving camera, with FIG. 1 showing a condition where the contact screen has been moved up off the photographing light path and FIG. 2 showing a condition where the contact screen has descended to the position in front of the film holder and has been sucked and held tightly to the latter while the squeegee rollers have rolled down along said film holder surface.

Figure 1:
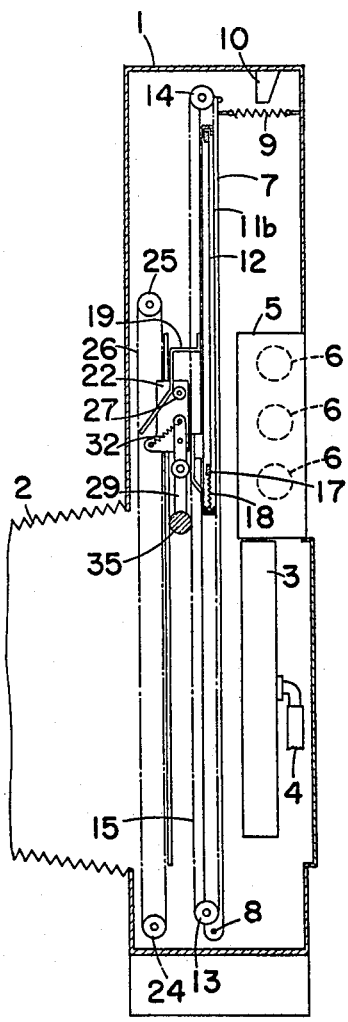

Referring generally to the drawings, reference numeral 1 designates a casing of a photoengraving camera, said casing being connected to a lens mount, not shown, by means of a flexible bellows 2 so as to form a light-proof camera. Housed in the inside of said casing 1 is a vacuum suction type film holder 3 which has formed in its front side a plurality of small aperatures and is provided at its backside with a suction pipe 4 which is connected to a vacuum pump, not shown, whereby air is sucked in from said aperatures to suck the film and contact screen placed in front of the film holder 3 so as to tightly attach them to the latter. Above said film holder 3 is provided a film magazine 5 which contains roll films 6, 6, . . . ., with one of said roll films being selected in operation and delivered to the position in front of the film holder so that said film will be sucked and attached in the manner described above. As the arrangement in this section is same as used in prior art and has no direct bearing on the understanding of the present invention, no detailed explanation on such arrangement is given here.

Figure 2:
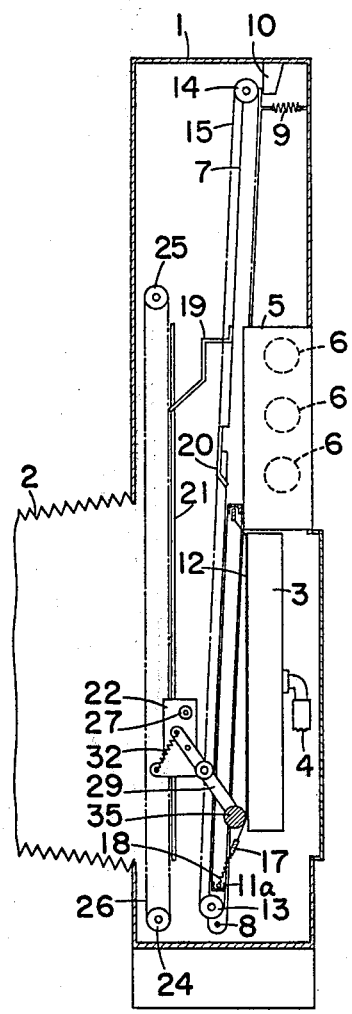

Provided in front of said film holder 3 is a movable frame 7 arranged swingable in the back and forth direction centered by a horizontal shaft 8 at the bottom end of said frame, and a spring 9 is connected in tension between the upper end of said frame and the rear face of the casing 1. Thus, the movable frame 7, when in the free state, is sustained in a tilted condition with the upper end thereof pressing against a stopper 10 secured to the top portion of the casing 1 as shown in FIG. 2.

Figure 3:
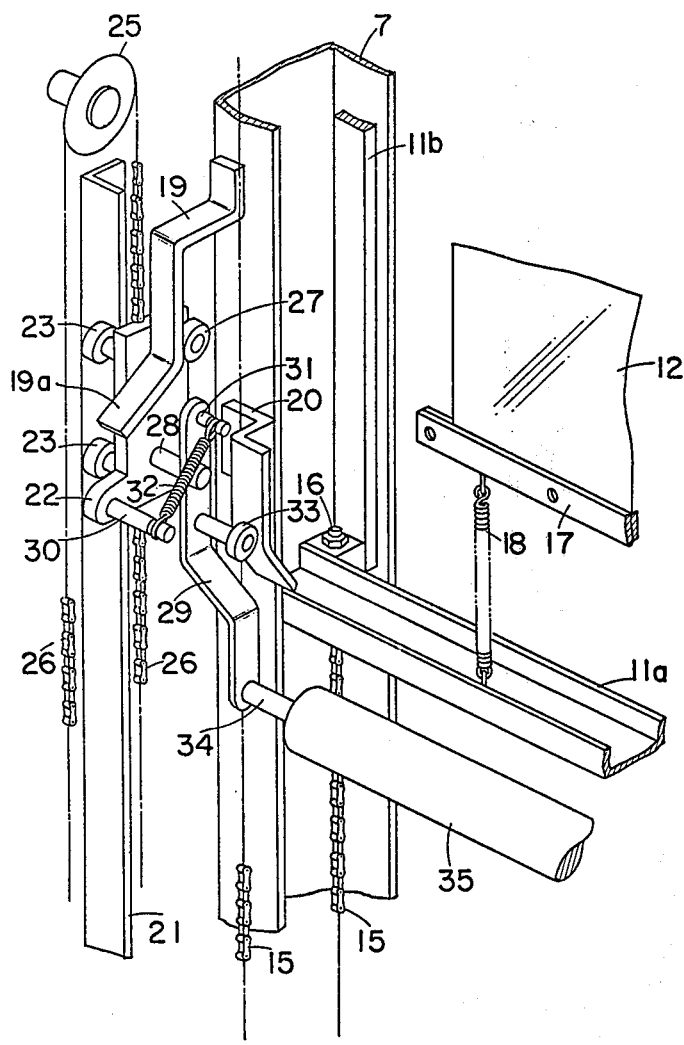
FIG. 3 is perspective view, as taken from the inside of the essential parts of the device shown in FIGS. 1 and 2.

It will be also seen that a retaining frame 11, to which a contact screen 12 is secured, is vertically slidably supported by said movable frame 7. On both sides of both upper and lower ends of said movable frame 7 are mounted paired sprocket wheels 13 and 14 around which chains 15 are passed, said chains being joined to said retaining frame 11 so that said retaining frame may be lifted up or down as said sprocket wheels 13 are rotated by a suitable driving means (not shown). As shown in FIG. 3, the retaining frame 11 consists of a pair of vertically spaced-apart channel-shaped ledges or crosspieces 11a and a pair of laterally spaced-apart connecting bars 11b, and at four corners of said frame 11 are provided chain connecting means 16 whereby to connect chains 15. In FIG. 3, there are shown only one ledge 11a (lower one) and only one connecting bar 11b (positioned on one side).

At both upper and lower ends of the contact screen 12 are secured crosspieces or furrings 17, which are, in turn, secured to the retaining frame 11. The upper furring 17 is directly fastened to the corresponding the upper ledge 11a, while the lower furring is connected to the lower ledge 11a through the medium of springs 18 as shown in FIG. 3. The movable frame 7 is also provided with a first cam means 19 having a forwardly-downwardly projecting slant piece 19a and a squeegee roller guide 20 (second guide cam means), which are to be described later.

On the interior of the casing 1 are laid guide rails 21 along which a squeegee roller lift block 22 can move up and sown to lift up or down a pair of squeegee rollers. For this purpose, wheels 23,23 (only two wheels are shown in FIG. 3) are provided on the lift block 22 so as to hold each guide rail 21. A chain 26 passed round the sprocket wheels 24 and 25 provided in the casing 1 is joined to said lift block 22 and is driven by a driving means, not shown, to rotate the sprocket wheel 24 to thereby let said lift block 22 move up and down.

On the interior side of said lift block 22, that is, on the side not opposed to said guide rails 21, there is rotatably journalled a wheel 27 which is arranged such that when the lift block 22 has ascended to its upper limit position, said wheel will be engaged with the guide 19 on the movable frame 7 so as to let said swingable frame 7 move forwardly from the rearwardly tilted position shown in FIG. 2 to the vertical position shown in FIG. 1.

Also, a shaft 28 extends from the inside and centrally of the lift block 22, with a lever 29 being swingably pivoted by said shaft 28, and a spring 32 is connected between a pin 30 planted horizontally to the inside of the front lower portion of the lift block 22 and a pin 31 planted sidewise to the inside of the upper end of the lever 29. A wheel 33 for squeegee roller 35 is provided on the inside of the lever 29 at a point lower than its pivot point about the shaft 28, and a squeegee roller shaft 34 is secured to the inside of the lower end of said lever 29. The wheel 33 is arranged such that when the lift block 22 has reached the upper limit of its upward stroke, said wheel will abut against the guide cam means 20 secured to the movable frame 7 to turn the squeegee roller 35 so that it will separate from the film holder 3 as shown in FIGS. 1 and 3. The rubber-made squeegee roller 35 is rotatably mounted on the shaft 34 and is arranged such that when the lever 29 is turned by the spring 32, said squeegee roller 35 will press the contact screen 12 against a face of the film holder 3 as shown in FIG. 2.

Now, the operation of the mechanism according to the present invention is described by following the process.

First, in the condition of FIG. 1, where the squeegee roller lift block 22 and contact screen retaining frame 11 have ascended and the movable frame 7 has swung forwardly, a film is delivered from the film magazine 5 and sucked and retained stuck to the film holder 3. Then the retaining frame 11 is lowered to let the contact screen 12 take its position in front of the film holder 3.

Then, the squeegee roller lift block 22 is lowered, whereupon as the wheel 27 also moves down along the bevel of the guide 19, the movable frame 7 is gradually inclined rearwardly as it is pulled by spring 9, thereby approaching the contact screen 12 to the film holder 3. However, since the contact screen 12 is held in tension in parallel to the surface of said movable frame 7 by spring 18, it is not yet sucked up to the film holder 3 at this stage. On the other hand, as the movable frame 7 is tilted rearwardly, the wheel 33 hits against the squeegee roller guide 20 to let it recede, causing the lever 29 to make a turning movement while pulled by spring 32, thereby approaching the squeegee roller 35 to the film holder 3. Thus, the squeegee roller 35 approaches the film holder 3 while descending with the lift block 22. Therefore, the positional relation between the guide 20 and wheel 33 is selected so that the squeegee roller 35 will abut against the surface of film holder 3 just when said squeegee roller 35 has descended to the same level as the top end on the film holder 3.

In this case, the contact screen 12 is held in tension in front of and slightly spaced-apart from the film holder 3, so the strength of springs 18 and 32 is selected such that the squeegee roller 35 will force the contact screen 12 to press against the film holder 3 by surmounting the opposing force of spring 18. In this way, the squeegee roller 35 rolls down while letting the contact screen 12 adhere to the film holder 3 gradually from its upper part, until the condition of FIG. 2 is attained, whereupon movement of the squeegee roller is stopped.

In this condition, the film and contact screen are retained in tight attachment to the front face of the film holder 3, and under this situation, the shutter of the lens mount, not shown, is opened to effect exposure.

Upon completion of exposure, first the suction of film holder 3 is released and then the squeegee roller is lifted up. In this case, the operation proceeds in the order just contrary to the above-said mounting operation. That is, the squeegee roller 35 rolls up in contact with the film holder 3 until the former reaches the upper end of the latter, and when the wheel 27 of the lift block 22 comes to abut against the underside of the slant piece 19a of the guide 19, the movable frame 7 separates from the stopper 10 and begins to move forwards. Coincidently with this, the wheel 33 also presses against the squeegee roller guide 20 to let the squeegee roller 35 separate from the film holder 3. Now, the squeegee roller guide 20 advances with the movable frame 7 and pushes the lever 29, whereupon the squeegee roller 35 rapidly recedes away from the film holder 3 and rises up while averting the upper ledge of the contact screen retaining frame 11. As no suction works on the film holder 3, the contact screen 12 is pulled by the spring 18 to leave the film holder gradually from its lower part in accordance with upward movement of the squeegee roller 35.

When the squeegee roller 35 completes its upward stroke, the film is cut at the upper edge of the film holder 3 by a cutter (not shown), and the exposed film is dropped below the casing 1 and contained in a suitable container. The cutting of film may be practiced previous to exposure, before mounting of the contact screen. Removal of the exposed films may be accomplished either by gravitational fall or by using a suitable carriage means, but these have no bearing on the essence of the present invention and hence are not discussed here.

In the above-described embodiment, in order to let the contact screen approach or separate from the film holder, the movable frame 7 is swung about a pivot provided at the lower end of the frame, but it is also possible to employ a system in which such approach and separation can be effected by horizontal movement.

Figure 4:
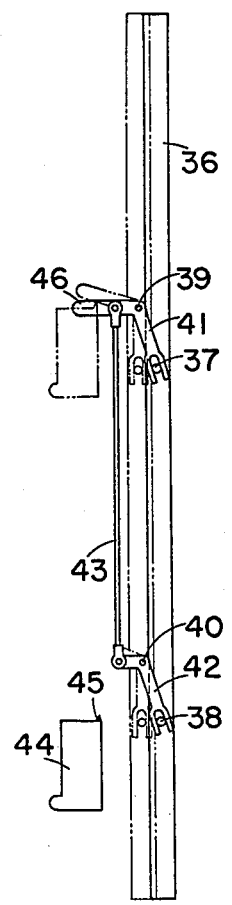
FIG. 4 is a side view showing the principal parts of another embodiment of the present invention.

FIg. 4 shows an embodiment of such system. In this embodiment, the movable frame 36 is supported by a guide, not shown, so that said frame may make parallel movement in the back and forth direction, and a pair of horizontal pins 37 and 38 are planted to extend from both sides of said frame. Also, crank arms 41 and 42 are swingably pivoted to the shafts 39 and 40, respectively, which are secured to the body side of the camera casing, with one end of each of said crank arms being forked so as to loosely receive therein said pin 37, 38, and said both crank arms are connected by a rod 48. One end of the upper crank arm 41 is extended as shown so that when the squeegee roller lift block 44 has ascended, a protuberance 45 provided on said block will hit against said extended portion 46 of said crank arm 41 to turn it to let the frame 36 move forwardly to thereby separate the contact screen from the film holder. Although in this embodiment the engagement between the respective crank arms and the swingable frame is effected by loose fitting of pins 37 and 38 in the respective forks, it is possible to adopt in this portion a simple swingable bearing means designated to support said frame 36, thereby eliminating use of any guide means. In the latter case, the frame moves not linearly but along a circular path centered by the shaft 39 or 40, but no trouble arises in practice.

As described above in detail, according to the contact screen mounting device of the present invention, the mechanism for retaining and moving the contact screen vertically as well as laterally and the mechanism for driving the squeegee rollers are provided as separate but operatively interlocked units, thereby excluding the irrationality of the conventional systems in which the squeegee roller driving mechanism, which is large in both weight and volume, is moved up and down along with the contact screen retaining assembly. Further, as the contact screen, when stuck to the film holder by suction force, is only slightly bent in one direction and also no roller is contacted with the screen surface, there is little possibility that the contact screen will be flawed or damaged. Moreover, exchange of the contact screen can be effected with ease and also various kinds of works (such as altering the number of screen lines or screen angle) can be accomplished promptly.

The foregoing description and drawings merely show an illustrative embodiment of the present invention, and the invention is by no means restricted to such embodiment.

We claim:

1. A contact screen mounting device for use in a photoengraving camera, comprising: a contact screen retaining frame adopted to retain a contact screen in front of a vacuum suction type film holder and movable to let said contact screen approach or separate from said film holder surface, and squeegee means adapted to move up and down so as to let said contact screen tightly attach to said film holder, and first guide cam means on said frame enabling said contact screen retaining frame to move toward or away from said film holder surface in accordance with vertical movement of said squeegee means.

2. The device as set forth in claim 1, including a second guide cam means on said frame enabling said squeegee means to move toward or away from the film holder surface in accordance with the movement of said contact screen retaining frame relative to said film holder surface.

3. The device as set forth in claim 1, wherein said contact screen retaining frame is arranged movable up and down.

4. The device as set forth in claim 1, wherein said contact screen retaining frame is arranged swingable in the back and forth direction.

5. The device as set forth in claim 1, wherein said contact screen retaining frame is vertically movably supported by a movable frame which is swingable in the back and forth direction.

6. The device as set forth in claim 1, wherein said contact screen retaining frame is supported by a movable frame which generates parallel movement in the back and forth direction.

7. The device as set forth in claim 1, wherein said squeegee means is a squeegee roller arranged to be movable up and down by chain means.

8. A contact screen mounting device for use in a photoengraving camera, comprising: a contact screen retaining frame, positioned in front of a vacuum suction type film holder, is supported by a back-and-forth swingable frame pivotally supported at its lower end by a transverse horizontal shaft, and a squeegee means, for tightly attaching the contact screen against said folm holder, is arranged such that when it ascends, a part thereon hits against a forwardly-downwardly projecting slant piece provided in said movable frame to let said movable frame tilt forwardly to thereby separate the contact screen retaining frame from the film holder.

9. The device as set forth in claim 8, wherein said contact screen retaining frame is arranged movable up and down.

10. The device as set forth in claim 8, wherein said squeegee means is a squeegee roller arranged to be moved up and down by chain means.

* * * * *